(12) United States Patent
Osada

(10) Patent No.: US 12,377,506 B2
(45) Date of Patent: Aug. 5, 2025

(54) WORKPIECE MACHINING DEVICE AND MACHINING CONTROL METHOD

(71) Applicant: FANUC CORPORATION, Yamanashi (JP)

(72) Inventor: Reo Osada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 377 days.

(21) Appl. No.: 17/759,923

(22) PCT Filed: Feb. 1, 2021

(86) PCT No.: PCT/JP2021/003605
§ 371 (c)(1),
(2) Date: Aug. 2, 2022

(87) PCT Pub. No.: WO2021/157538
PCT Pub. Date: Aug. 12, 2021

(65) Prior Publication Data
US 2023/0069227 A1    Mar. 2, 2023

(30) Foreign Application Priority Data
Feb. 3, 2020  (JP) .................................. 2020-016600

(51) Int. Cl.
*B23Q 15/12*        (2006.01)
*G05B 19/418*       (2006.01)

(52) U.S. Cl.
CPC ......... *B23Q 15/12* (2013.01); *G05B 19/4189* (2013.01); *G05B 2219/35191* (2013.01)

(58) Field of Classification Search
CPC .............. B23Q 15/12; G05B 19/4189; G05B 2219/35191; G05B 19/18; G05B 19/042; Y02E 60/10; Y02P 70/50
See application file for complete search history.

(56) References Cited

U.S. PATENT DOCUMENTS

| | | | | |
|---|---|---|---|---|
| 5,521,830 A * | 5/1996 | Saito | ...................... | B23Q 7/007 700/192 |
| 2003/0028282 A1* | 2/2003 | Oh | .......................... | G06Q 10/06 700/213 |

(Continued)

FOREIGN PATENT DOCUMENTS

| CN | 107966956 A | 4/2018 |
|---|---|---|
| CN | 108021099 A | 5/2018 |

(Continued)

OTHER PUBLICATIONS

International Search Report in PCT/JP2021/003605, mailed Apr. 13, 2021. 2pp.

*Primary Examiner* — Mohammad Ali
*Assistant Examiner* — Dhruvkumar Patel
(74) *Attorney, Agent, or Firm* — HAUPTMAN HAM, LLP

(57) ABSTRACT

A workpiece machining device includes a sensor unit that detects the passage of a moving workpiece W, a machining unit that performs machining using a predetermined machining tool in a state where the workpiece W is moved, and a machining control unit that controls the operation of the machining unit. The machining control unit issues an operation command signal $S_P$ to the machining unit at intervals of a predetermined control cycle T, measures a detection time $T_D$ taken to receive a detection signal $S_D$ relative to a cycle start time point of the control cycle T, stores various parameters including the detection time $T_D$, a difference between the control cycle T and the detection time $T_D$ is defined as a response delay time, and modifies the operation command signal $S_P$ in each control cycle T on the basis of the response delay time $T_D$.

14 Claims, 7 Drawing Sheets

(56) References Cited

U.S. PATENT DOCUMENTS

| | | | |
|---|---|---|---|
| 2015/0212517 A1* | 7/2015 | Huang | G05B 19/41865 |
| | | | 700/112 |
| 2016/0126120 A1* | 5/2016 | Oza | H01L 21/67733 |
| | | | 700/121 |
| 2018/0113433 A1 | 4/2018 | Ishiwari | |
| 2018/0120819 A1 | 5/2018 | Ishiwari | |
| 2018/0164788 A1* | 6/2018 | Shimamura | B25J 9/0093 |
| 2018/0194573 A1* | 7/2018 | Iwai | B25J 9/1697 |
| 2020/0142387 A1* | 5/2020 | Wahrén | G05B 19/4185 |

FOREIGN PATENT DOCUMENTS

| | | | | |
|---|---|---|---|---|
| JP | H06-110554 A | 4/1994 | | |
| JP | H1032001 A | 2/1998 | | |
| JP | 201044449 A | 2/2010 | | |
| JP | 201950096 A | 3/2019 | | |
| WO | WO-2010010078 A1 * | 1/2010 | | B23P 21/004 |

* cited by examiner

WORKPIECE MACHINING DEVICE AND MACHINING CONTROL METHOD

RELATED APPLICATIONS

The present application is a National Phase of International Application No. PCT/JP2021/003605 filed Feb. 1, 2021, which claims priority to Japanese Patent Application No. 2020-016600, filed Feb. 3, 2020.

TECHNICAL FIELD

The present invention relates to a workpiece machining device and a machining control method, and more particularly to a workpiece machining device and a machining control method using the workpiece machining device, the workpiece machining device including a sensor unit that detects passage of a moving workpiece and issues a detection signal, a machining unit that performs machining on the workpiece using a predetermined machining tool by activating a machining mechanism in a state where the workpiece is moved, and a machining control unit that controls the operation of the machining unit on the basis of the detection signal from the sensor unit.

BACKGROUND ART

A device and a machining control method therefor in which a plurality of workpieces are continuously transported on a transportation mechanism and predetermined machining is implemented on each workpiece by a separately controlled machining unit as the workpieces move (in other words, while the workpieces are transported) are available as an example of a method for machining and manufacturing a large number of workpieces by performing predetermined machining repeatedly and continuously on workpieces moving at a predetermined speed. With this type of device, the same repeated machining can be executed cyclically and continuously on a plurality of workpieces, and therefore the device is suitable for mass production of workpieces subjected to predetermined machining and so on.

However, with the device and machining control method described above, in a case where a plurality of workpieces are transported on a transportation mechanism, for example, positioning of the continuously transported workpieces relative to a machining position in the machining unit greatly affects the machining precision. Normally, therefore, a method of detecting the workpieces transported on the transportation mechanism using a sensor of some type and controlling machining by the machining unit on the basis of a resulting detection signal is employed.

As an example of this machining control, PTL 1, for example, discloses a device for manufacturing a bipolar electrode forming a bipolar battery, and a control method therefor, the device including: a transportation device for transporting a workpiece in a longitudinal direction, the workpiece including a strip-form conductive sheet and a plurality of active material layers arranged intermittently on both surfaces of the conductive sheet in the longitudinal direction thereof; a cutting roll that has a rotary axis extending in a latitudinal direction of the conductive sheet and cuts the conductive sheet between adjacent active material layers by rotating about the rotary axis; a sensor that measures the pitch between the adjacent active material layers; and a driving device that moves the cutting roll in the longitudinal direction in accordance with a difference between the measured pitch and a reference value. Thus, the position of the cutting roll in the transportation direction can be adjusted, and as a result, positional deviation of the cutting position can be eliminated.

CITATION LIST

Patent Literature

[PTL 1] Japanese Patent Application Publication No. 2019-50096

SUMMARY OF INVENTION

Technical Problem

Incidentally, in a device such as that disclosed in PTL 1, for example, the transportation device on which the workpieces are continuously transported and the driving device including the cutting roll that machines the workpieces as the workpieces are transported are controlled by separate control means, and therefore a control device for controlling the driving device that moves the cutting roll typically issues a command to start an operation of the cutting roll using as a trigger a detection signal from a sensor that detects passage of the workpieces transported by the transportation device. In a control device of this type, a control cycle in which control is performed in real time differs (deviates) from the reception timing of the detection signal from the sensor, and in accordance with this "deviation", the timing at which the cutting means (the cutting roll of PTL 1, for example) contacts the workpiece also deviates for each workpiece, which affects the machining precision.

In view of these circumstances, there is a need for a workpiece machining device and a machining control method using the workpiece machining device, with which, during control of a machining device for machining a workpiece moving at a predetermined speed, it is possible to suppress a reduction in the machining precision due to a deviation between the control cycle and the workpiece detection timing.

Solution to Problem

A workpiece machining device according to an aspect of the present invention includes a sensor unit that issues a detection signal upon detection of passage of a moving workpiece, a machining unit that performs machining on the workpiece using a predetermined machining tool by activating a machining mechanism in a state where the workpiece is moved, and a machining control unit that controls an operation of the machining unit on the basis of the detection signal from the sensor unit, wherein the machining control unit includes a main control unit that issues an operation command signal to the machining mechanism of the machining unit at intervals of a predetermined control cycle, a timing unit that measures a detection time taken to receive the detection signal relative to a cycle start time point of the control cycle, and a memory that stores various parameters including the detection time, a difference between the control cycle and the detection time is defined as a response delay time, and the main control unit modifies the operation command signal on the basis of the response delay time.

Further, a machining control method according to an aspect of the present invention is a method for performing machining on a workpiece using a predetermined machining tool by activating a machining mechanism of a machining unit while being moved the workpiece on the basis of a detection signal from a sensor unit that detects passage of the moving workpiece, the method comprising controlling the machining by measuring a detection time taken to receive the detection signal relative to a cycle start time point of a predetermined control cycle for controlling the machining mechanism, calculating a response delay time from a difference between the control cycle and the detection time, and modifying an operation command signal issued to the machining mechanism in each control cycle on the basis of the response delay time.

Advantageous Effects of Invention

According to this aspect of the present invention, when a workpiece is machined by a predetermined machining tool by activating a machining mechanism of a machining unit on the basis of a detection signal from a sensor unit that detects passage of the moving workpiece, the machining tool is controlled by measuring the detection time taken to receive the detection signal relative to a cycle start time point of a predetermined control cycle for controlling the machining mechanism, and modifying an operation command signal issued to the machining mechanism in each control cycle on the basis of a response delay time, which is defined as the difference between the control cycle and the detection time. As a result, during control of a machining device for machining a workpiece moving at a predetermined speed, a reduction in machining precision due to a deviation between the control cycle and the detection timing of the workpiece can be suppressed.

DESCRIPTION OF EMBODIMENTS

An embodiment of a workpiece machining device and a workpiece control method using the workpiece machining device according to a representative example of the present invention, with which machining is performed on a workpiece by a predetermined machining tool by activating a machining mechanism of a machining unit while being moved the workpiece on the basis of a detection signal from a sensor unit that detects passage of the workpiece moving at a predetermined speed, will be described below together with the figures.

Figure 1:
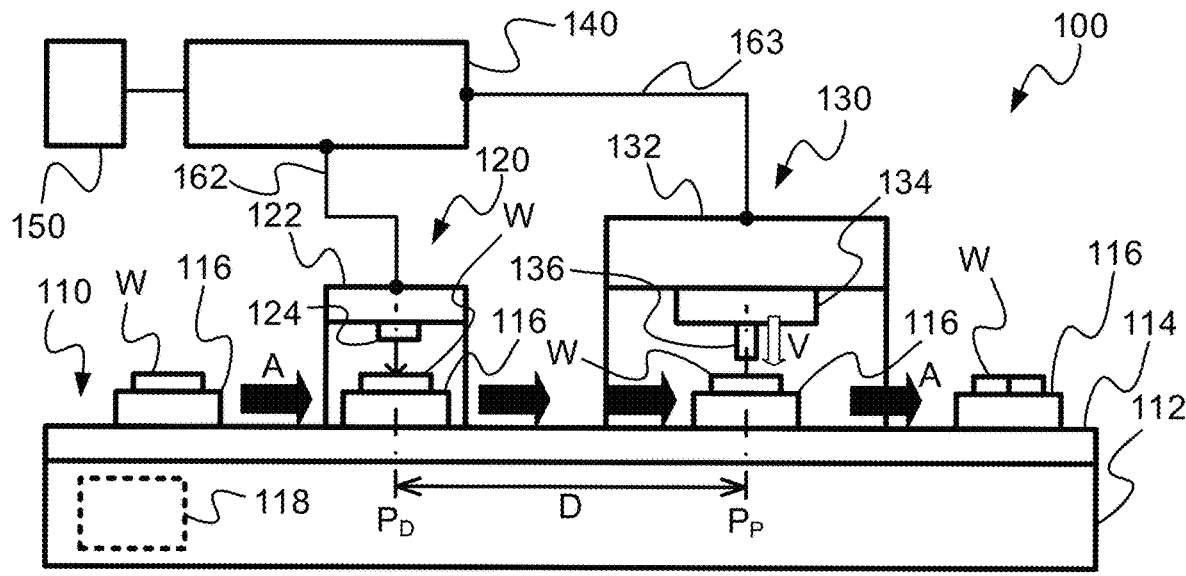
FIG. 1 is a schematic view showing a configuration of a workpiece machining device serving as a representative example of the present invention.

FIG. 1 is a schematic view showing a configuration of a workpiece machining device according to a representative example of the present invention. As shown in FIG. 1, a workpiece machining device 100 includes, as an example of an aspect in which a workpiece W is machined while being moved, a transportation mechanism 110 that transports the workpiece W at a constant speed in a single predetermined direction A, a sensor unit 120 that detects passage of the workpiece W during transportation thereof, a machining unit 130 that performs predetermined machining on the workpiece W by activating a machining mechanism 134 while the workpiece W is transported, a machining control unit 140 that controls an operation of the machining unit 130 on the basis of a detection signal from the sensor unit 120, and an input interface 150 through which a user inputs information into the machining control unit 140. Here, the machining control unit 140 is connected to the sensor unit 120 and the machining unit 130 via signal lines 162 and 163, respectively, and configured to exchange various signals therewith. Note that in the example shown in FIG. 1, to make it easier to understand the invention, a case in which the workpiece W moves at a constant speed in a single predetermined direction is shown as an example, but as long as the sensor unit 120 can detect passage of the workpiece W so that the course and the speed of the workpiece W can respectively be ascertained, the present invention is not limited to a single direction or a constant speed.

The transportation mechanism 110 includes, for example, a base 112 that extends in the transportation direction A of the workpiece, a transportation path 114 formed on an upper surface of the base 112 along the transportation direction A, a pallet 116 that moves along the transportation path 114 while holding the workpiece W, and a transportation control unit 118 that controls the operation of the transportation mechanism 110. Note that in FIG. 1, a case in which four pallets 116 holding workpieces W are simultaneously transported is shown as an example, but the number of pallets 116 may be singular or plural and may be set as desired.

Figure 2:
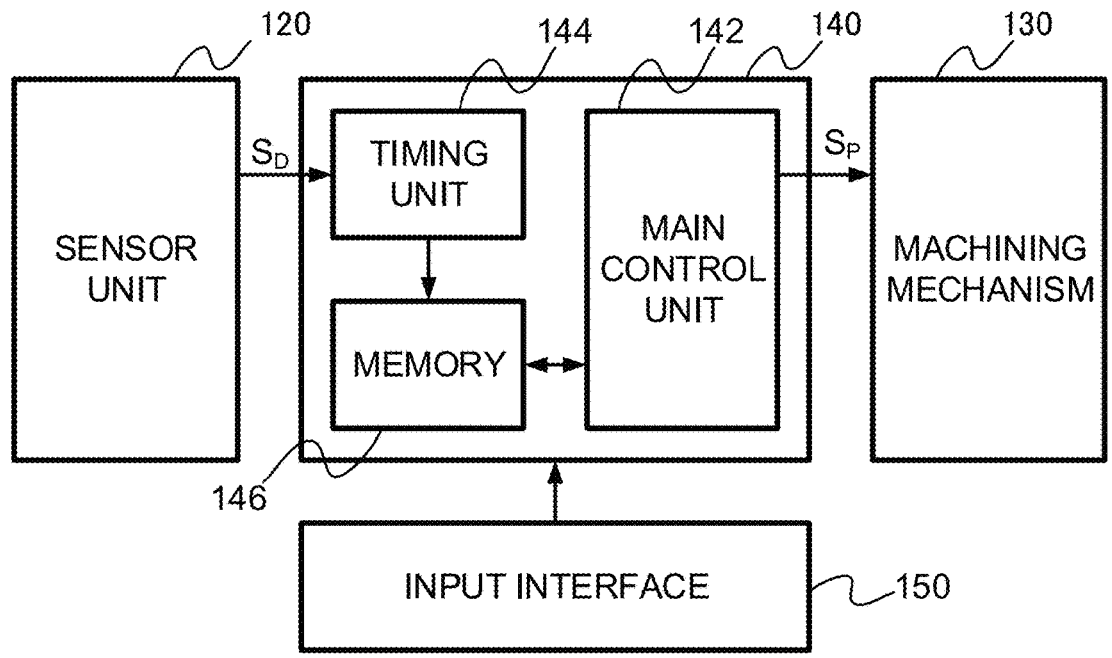
FIG. 2 is a block diagram showing a representative example of a machining control unit shown in FIG. 1.

In FIG. 2, the transportation path 114 is structured so as to move the pallet 116 holding the workpiece W at a constant speed in the transportation direction A. A structure using a plurality of transportation rollers, a structure including a linear drive mechanism, or the like may be cited as examples of the transportation path 114, but any desired structure may be employed. Note that a case in which the pallet 116 is used to transport the workpiece W while supporting the workpiece W with stability is shown as an example, but the pallet 116 may be omitted and the workpiece W may be moved directly along the transportation path 114. Further, as the pallet 116, a structure in which the workpiece W is clamped and held directly, an electrostatic chuck structure, or any other desired structure may be employed.

The sensor unit 120 includes, for example, a sensor support 122 and a sensor body 124 having a field of view (a detection region) oriented downward from the sensor support 122, and is configured to issue a detection signal $S_D$ (see FIG. 2) when a part of the workpiece W crosses (passes) a measurement reference plane $P_D$ in the transportation direction A. Any desired structure may be employed as the sensor body 124 as long as passage of the workpiece W can be detected thereby, and either a "contact type" that detects the workpiece W or the pallet 116 by contact or a "non-contact type" that detects the workpiece W or the pallet 116 without contact may be used. Note that in the sensor unit 120 shown in FIG. 1, a photoelectric sensor is suitable as the sensor body 124.

The machining unit 130 includes, for example, a support 132 and a machining mechanism 134 to which a machining tool 136 is attached so as to be oriented toward the transportation path 114 from the support 132, and the machining unit 130 is configured to perform predetermined machining on the workpiece W using the machining tool 136 by having the machining mechanism 134 cause the machining tool 136, which is disposed in a machining position $P_P$ relative to the workpiece W transported along the transportation path 114, to advance and retreat at a movement speed V. Here, as shown in FIG. 1, a distance from the measurement reference plane $P_D$ of the sensor unit 120 to the machining position $P_P$ is defined as a reference transportation distance D. Further, a cutting blade or a drilling tool for cutting the workpiece W, a tool for performing printing or adhering on the surface of the workpiece W, or any other desired structure may be employed as the machining tool 136.

FIG. 2 is a block diagram showing a representative example of the machining control unit shown in FIG. 1. As shown in FIG. 2, the machining control unit 140 is configured to include, for example, a main control unit 142 that issues an operation command signal $S_P$ to the machining mechanism 134 of the machining unit 130, a timing unit 144 that measures a detection time $T_D$ (see FIG. 3) taken to receive the detection signal $S_D$ from the sensor unit 120 relative to a cycle start time point of a control cycle of the main control unit 142, and a memory 146 that stores various parameters including the measured detection time $T_D$. The main control unit 142 has a function for modifying the operation command signal $S_P$ output to the machining unit 130 in each control cycle T on the basis of a response delay time $T-T_D$ from the detection time point $T_D$ in the sensor unit 120 to the control cycle T.

The timing unit 144 is configured as, for example, a sensor detection circuit (a latch circuit) for monitoring input of the detection signal $S_D$ from the sensor unit 120 in real time. For example, the timing unit 144 has an inbuilt counter (not shown) that is counted up at 1 µsec intervals. The counter is preset at each control cycle of the main control unit 142, and when the detection signal $S_D$ is input, the timing unit 144 calculates the detection time $T_D$ and the response delay time $T-T_D$ and stores the results in the memory 146.

Here, the timing unit 144 and the memory 146 are configured such that when a plurality of workpieces W are transported by the transportation mechanism 110, the detection time $T_D$ and the response delay time $T-T_D$ can be calculated and stored for each individual workpiece W. Thus, a plurality of workpieces W can be machined while being transported simultaneously, and as a result, the overall productivity of the workpiece machining device 100 can be improved.

Further, the input interface 150 is configured as input means into which a user using the workpiece machining device 100 can input conditions, additional information, and so on required for the machining, whereupon the input information and so on are transmitted to the machining control unit 140. An input terminal having a display screen, a keyboard, or the like, a touch panel type input unit, and so on may be cited as examples of the input interface 150. Furthermore, FIG. 1 shows an example in which the input interface 150 is connected to the machining control unit 140 by a wire, but the input interface 150 and the machining control unit 140 may be connected wirelessly so as to exchange information by wireless communication.

Figure 3A:
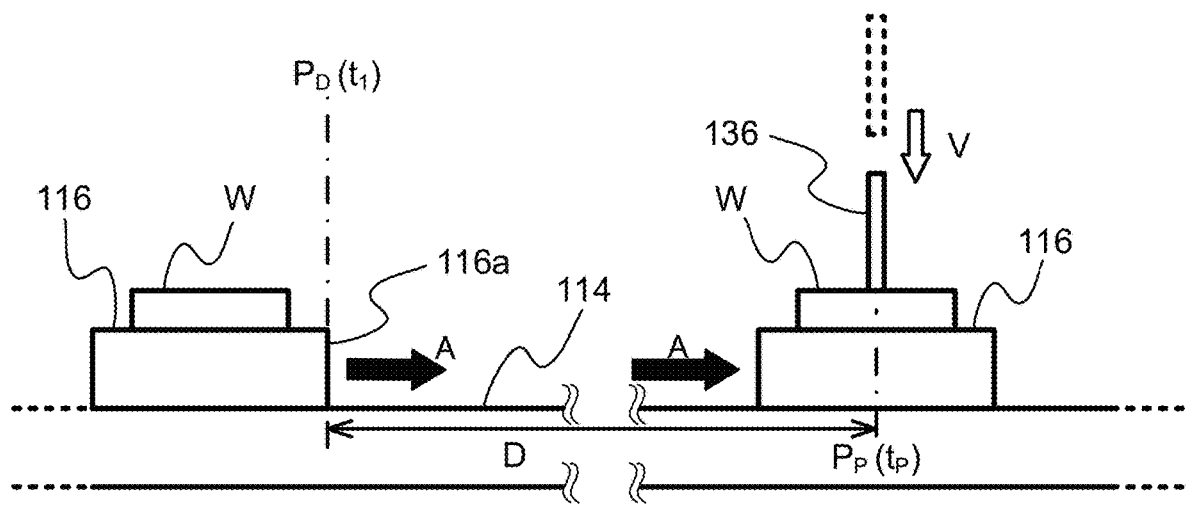
FIG. 3A is a schematic view showing an example of a reference machining state executed by the workpiece machining device shown in FIG. 1.
Figure 3B:
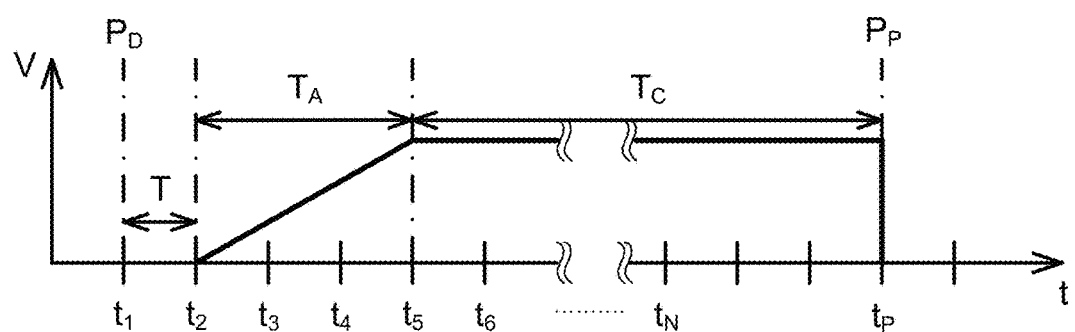
FIG. 3B is a schematic view showing an example of the reference machining state executed by the workpiece machining device shown in FIG. 1.

FIGS. 3A and 3B are schematic views showing an example of a reference machining state executed by the workpiece machining device shown in FIG. 1. In a machining control method according to a representative example of the present invention, a configuration in which the transportation mechanism 110 and the machining unit 130 are controlled independently by individual control units and the machining unit 130 executes machining control on the basis of the detection signal $S_D$ from the sensor unit 120 is employed. Accordingly, a "reference machining state" serving as a reference is envisaged between a timing at which the sensor unit 120 detects the workpiece W transported by the transportation mechanism 110 and a timing at which the machining unit 130 performs the predetermined machining on the workpiece W.

More specifically, as shown in FIG. 3A, first, it is assumed that a tip end 116a, in the transportation direction A, of the pallet 116 holding the workpiece W moving along the transportation path 114 in the transportation direction A crosses the measurement reference plane $P_D$ at a time point $t_1$. Accordingly, in the "reference machining state", the time point $t_1$ is defined as a time that matches the cycle start time point ($t_1$ in FIG. 3A, for example) of the control cycle T of the main control unit 142. Note that in FIG. 3A, the tip end 116a of the pallet 116 is used as the detection subject, but the tip end of the workpiece W in the transportation direction A may be used as the detection subject instead.

At this time, when the sensor unit 120 outputs the detection signal $S_D$ at the time point $t_1$, in the machining control unit 140 in which the detection signal $S_D$ is received, at a point following the elapse of a predetermined control cycle from the time point $t_1$ (for example, a time point $t_2$ following the elapse of one cycle T), the main control unit 142 outputs the operation command signal $S_P$ in each control cycle T as a distributed pulse instructing the machining mechanism 134 to drive the machining tool 136 at the movement speed V. Thus, in the "reference machining state", an operation is executed so as to establish a relationship in which a predetermined machining location on the workpiece W, which has been conveyed at a constant speed along the transportation path 114 by the reference transportation distance D, and the machining tool 136 driven at the movement speed V contact each other exactly at the machining position $P_P$.

FIG. 3B shows this series of operations in terms of the relationship between the elapsed time and the movement speed of the tool. As shown in FIG. 3B, in the reference machining state, when passage of the workpiece W is detected at the time point $t_1$, driving of the machining tool 136 is started at the time point $t_2$, and after the machining tool 136 has been driven in accordance with a predetermined cycle over an acceleration period $T_A$ and a constant speed movement period $T_C$, machining is implemented on the workpiece W at a time point tp and in the machining position $P_P$. Thus, in the "reference machining state", when the cycle start time point of the control cycle T of the main control unit 142 matches the workpiece detection time point of the sensor unit 120, machining can be executed by the machining tool 136 in the correct machining location of the workpiece W.

Note that in the example of the reference machining state shown in FIGS. 3A and 3B, a case in which the movement of the machining tool 136 is constituted by the acceleration period $T_A$, in which the machining tool 136 is moved by a constant acceleration, and the constant speed movement period $T_C$, in which the machining tool 136 advances at a constant speed, is shown as an example, but this is merely an example, and in the acceleration period $T_A$, the machining tool 136 may accelerate according to any desired speed pattern. Furthermore, likewise in the constant speed movement period $T_C$, the machining tool 136 does not have to move at a constant speed, and any desired speed pattern may be employed. Moreover, the movement of the machining tool 136 may be controlled using only the acceleration period $T_A$.

Next, using FIGS. 4A to 8B, specific embodiments of the machining control method using the workpiece machining device according to the representative example of the present invention will be described. One feature of the machining control method according to the representative example of the present invention is that the user can select a correction pattern for correcting a "deviation" between the detection time point at which the sensor unit 120 detects the workpiece W and the cycle start time point at which the main control unit 142 issues the command signal as desired using the input interface 150. Hence, in the following embodiments, specific aspects of correction patterns that can be selected by the user will be described.

Embodiment 1

Figure 4A:
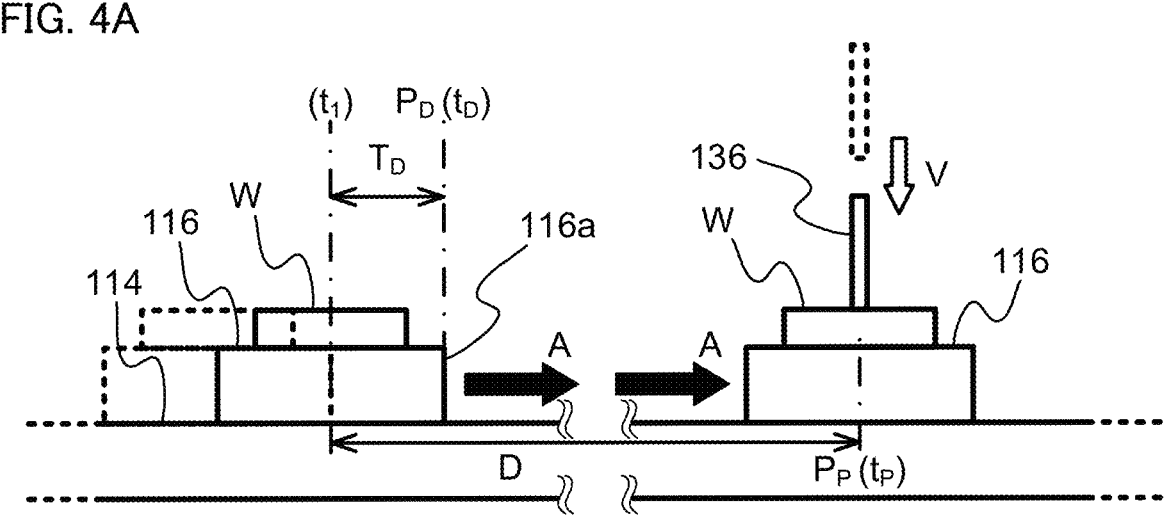
FIG. 4A is a schematic view showing a machining control method according to embodiment 1.
Figure 4B:
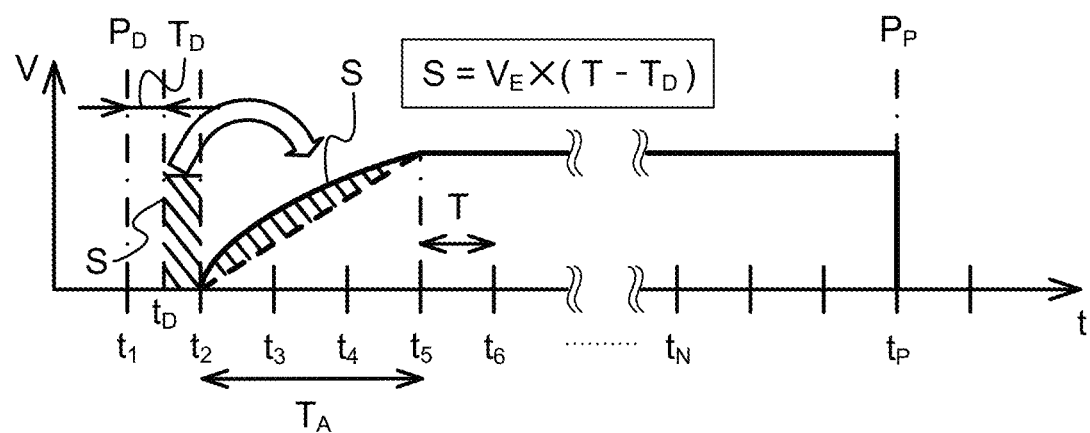
FIG. 4B is a schematic view showing the machining control method according to embodiment 1.

FIGS. 4A and 4B are schematic views showing a machining control method according to embodiment 1. In the machining control method according to embodiment 1, when the timing at which the sensor unit 120 detects the workpiece W is delayed to a detection time point $t_D$ from the control cycle T of the main control unit 142, a control is executed to determine, by calculation, a delay equivalent movement amount S by which the machining tool 136 would have been driven over the response delay time $T-T_D$ had the "delay" not existed (in other words, in the reference machining state), and add (tack on) the delay equivalent movement amount S to the actual movement speed of the machining tool 136.

More specifically, as shown in FIG. 4A, when the pallet 116 holding the workpiece W crosses the measurement reference plane $P_D$ at the time point $t_D$, which is a predetermined time after the start time point $t_1$ of the control cycle, in embodiment 1, the workpiece W is detected by the sensor unit 120 at the detection time point $t_D$, which is delayed by the detection time $T_D$ in comparison with FIG. 3A, and therefore the workpiece W appears to have been conveyed further by a distance corresponding to the detection time Tn. Hence, in the machining control unit 140 that receives the detection signal $S_D$ at the detection time point $t_D$, the main control unit 142 calculates the delay equivalent movement amount S by which it is assumed that the machining tool 136 will have moved by the next cycle start time point on the basis of the response delay time $T-T_D$, and generates the operation command signal $S_P$ in which the movement speed V of the machining tool 136 has been modified in accordance with the delay equivalent movement amount S.

At this time, the main control unit 142 outputs the control command signal $S_P$ modified as described above for each control cycle T at a predetermined cycle start time point following the detection time point $t_D$ at which the detection signal $S_D$ was received from the sensor unit 120. In other words, in embodiment 1, with respect to the machining control performed in the "reference machining state" shown in FIG. 3, the main control unit 142 adjusts the machining timing (the contact timing between the machining tool 136 and the workpiece W) of the machining tool 136 in accordance with the detection delay of the workpiece W by outputting the control command signal $S_P$, in which the movement speed V of the machining tool 136 has been increased in (tacked onto) the interval of the acceleration period $T_A$ by a speed corresponding to the delay equivalent movement amount S calculated on the basis of the response delay time $T-T_D$, to the machining unit 130 as a distributed pulse signal for each control cycle T.

FIG. 4B shows this series of operations in terms of the relationship between the elapsed time and the movement speed of the tool. As shown in FIG. 4B, in the machining control method according to embodiment 1, first, when the sensor unit 120 detects passage of the workpiece W at, for example, the detection time point $t_D$, which is delayed from the time point $t_1$ by the detection time $T_D$ relative to the control cycle T, the main control unit 142, having received the detection signal $S_D$, outputs the control command signal $S_P$ for starting to drive the machining tool 136 at a predetermined cycle start time point (the time point $t_2$, for example) after the detection time point $t_D$.

Simultaneously, the delay equivalent movement amount S by which the machining tool 136 will have moved by the time point $t_2$ assuming driving thereof is started at the detection time point $t_D$ is calculated using formula 1, shown below. Here, a speed $V_E$ denotes an arbitrary speed pattern of the machining tool 136 over the response delay time $T-T_D$.

$$S=V_E\times(T-T_D) \qquad [\text{Math. 1}]$$

Then, while the machining tool 136 is being driven, the main control unit 142 outputs the control command signal $S_P$ as a distributed pulse that is modified in each control cycle T by adding (tacking on) a speed corresponding to the delay equivalent movement amount S, calculated as described above, during the acceleration period $T_A$ so that the movement speed V of the machining tool 136 reaches a speed equivalent to the delay equivalent movement amount S taking the response delay time $T-T_D$ into account. Thus, it is possible to take into account the response delay time $T-T_D$ corresponding to the detection time $T_D$ taken to detect the workpiece W, and as a result, machining can be executed by the machining tool 136 in the correct machining location of the workpiece W.

Embodiment 2

Figure 5A:
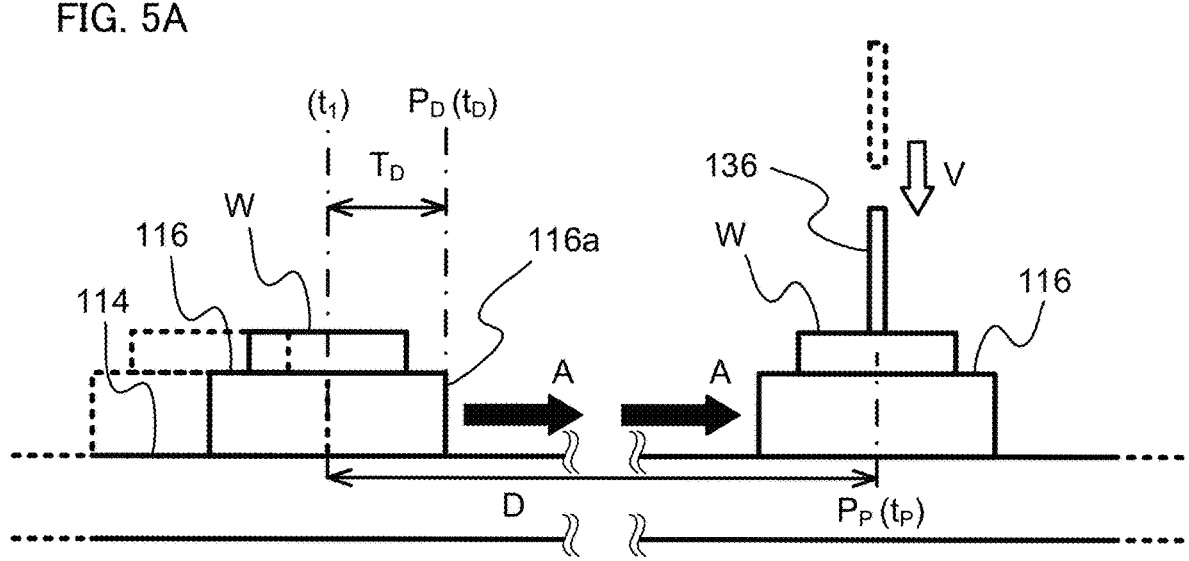
FIG. 5A is a schematic view showing a machining control method according to embodiment 2.
Figure 5B:
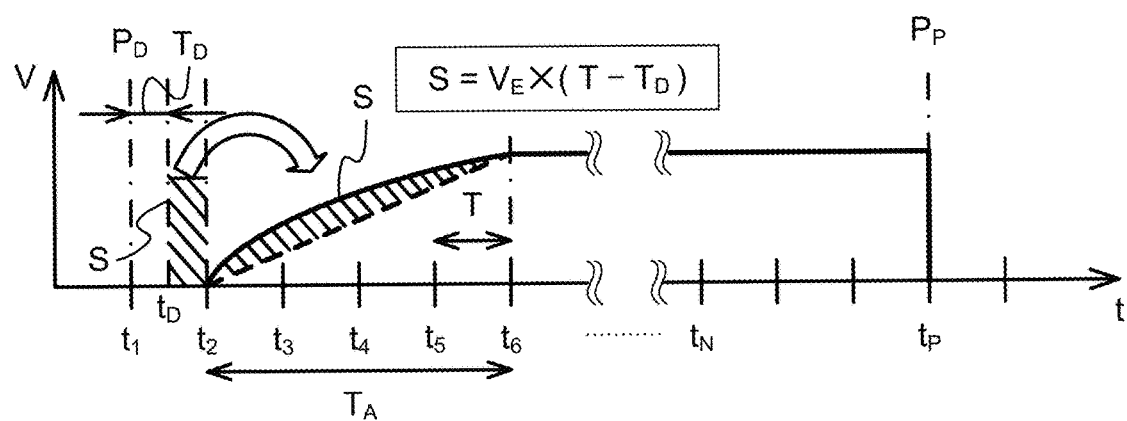
FIG. 5B is a schematic view showing the machining control method according to embodiment 2.

FIGS. 5A and 5B are schematic views showing a machining control method according to embodiment 2. In the machining control method according to embodiment 2, in contrast to the control method described in embodiment 1, the user can select the interval length of the acceleration period $T_A$ as desired.

More specifically, as shown in FIG. 5A, when the workpiece W is detected by the sensor unit 120 after being conveyed further by a distance corresponding to the detection time $T_D$, in the machining control unit 140, which receives the detection signal $S_D$ at the detection time point $t_D$, similarly to embodiment 1, the main control unit 142 calculates the delay equivalent movement amount S based on the response delay time $T-T_D$ and outputs the control command signal $S_P$, in which the movement speed V of the machining tool 136 has been modified in accordance with the delay equivalent movement amount S, as a distributed pulse in each control cycle T at a predetermined cycle start time point following the detection time point $t_D$ at which the detection signal $S_D$ was received from the sensor unit 120. At this time, the user selects and inputs the interval length (a length that is an integral multiple of the control cycle) of the acceleration period TA in advance from the input interface 150.

FIG. 5B shows this series of operations in terms of the relationship between the elapsed time and the movement speed of the tool. As shown in FIG. 5B, in the machining control method according to embodiment 2, similarly to the case of embodiment 1, when the sensor unit 120 detects passage of the workpiece W at the detection time point $t_D$, which is delayed from the time point $t_1$ by the detection time $T_D$, for example, the main control unit 142, having received the detection signal $S_D$, outputs the control command signal $S_P$ for starting to drive the machining tool 136 at a predetermined cycle start time point (the time point $t_2$, for example) following the detection time point $t_D$.

Simultaneously, the delay equivalent movement amount S by which the machining tool 136 will have moved by the time point $t_2$ assuming driving thereof is started at the detection time point $t_D$ is calculated using formula 1 described above. Then, while the machining tool 136 is being driven, the main control unit 142 modifies the control command signal $S_P$ by adding (tacking on) a speed corresponding to the calculated delay equivalent movement amount S during the acceleration period $T_A$ (the interval from the time point $t_2$ to a time point $t_6$) selected in advance by the user, and outputs the modified control command signal $S_P$ in each control cycle T so that the movement speed V of the machining tool 136 reaches a speed that is equivalent to the delay equivalent movement amount S taking into account the response delay time $T-T_D$.

Hence, likewise in embodiment 2, machining can be executed by the machining tool 136 in the correct machining location of the workpiece W while taking into account the response delay time $T-T_D$ corresponding to the detection time $T_D$ taken to detect the workpiece W. As shown in FIG. 5B, by lengthening the acceleration period $T_A$, the speed transition from the acceleration period $T_A$ to the constant speed movement period $T_C$ is smoother than in the case of embodiment 1, and as a result, speed control can be performed with improved accuracy in the constant speed movement period $T_C$.

Embodiment 3

Figure 6A:
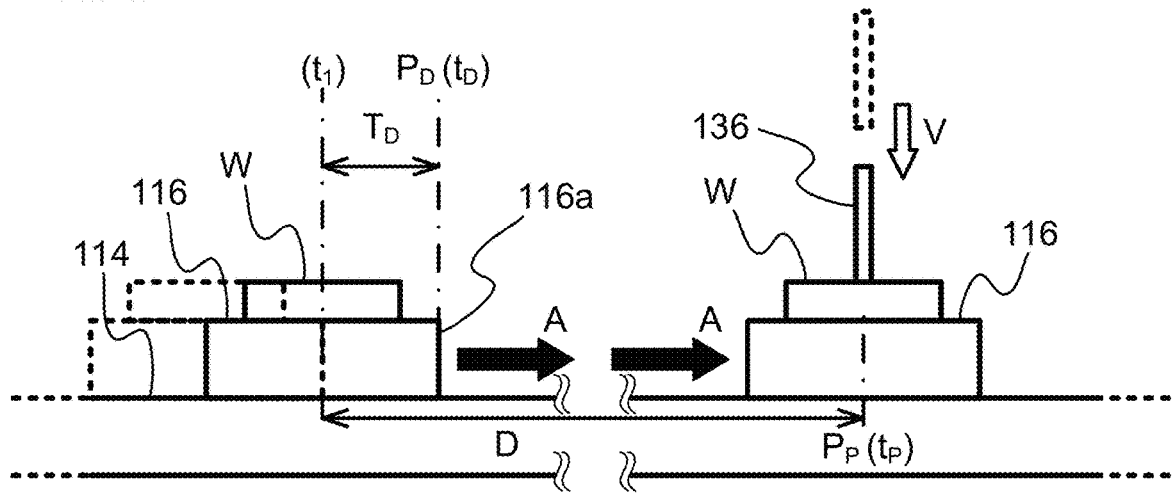
FIG. 6A is a schematic view showing a machining control method according to embodiment 3.
Figure 6B:
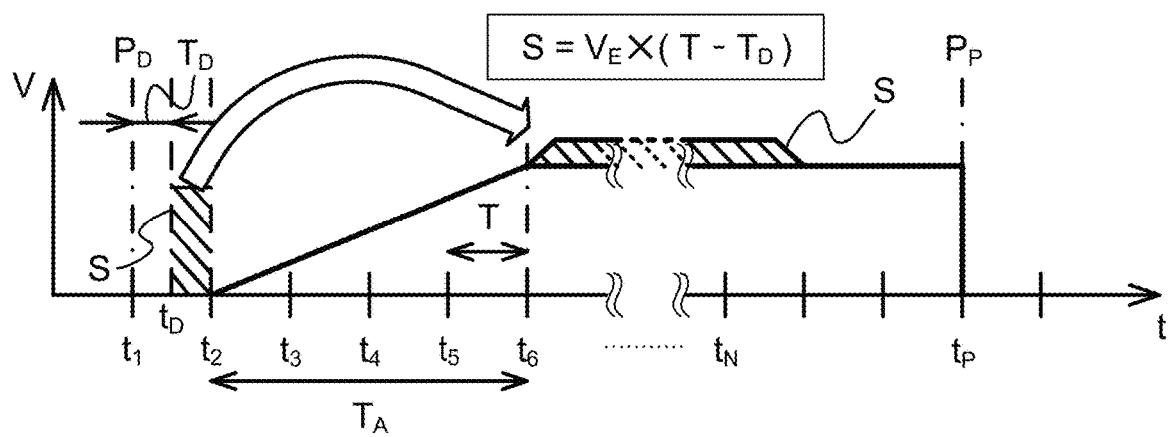
FIG. 6B is a schematic view showing the machining control method according to embodiment 3.

FIGS. 6A and 6B are schematic views showing a machining control method according to embodiment 3. In the machining control method according to embodiment 3, the movement speed V of the machining tool 136 is corrected over the course of the constant speed movement period $T_C$ on the basis of a user selection.

More specifically, as shown in FIG. 6A, when the workpiece W is detected by the sensor unit 120 after being conveyed further by a distance corresponding to the detection time $T_D$, in the machining control unit 140, which receives the detection signal $S_D$ at the detection time point $t_D$, similarly to embodiment 1, the main control unit 142 calculates the delay equivalent movement amount S based on the response delay time $T-T_D$ and outputs the control command signal $S_P$, in which the movement speed V of the machining tool 136 has been modified in accordance with the delay equivalent movement amount S, as a distributed pulse in each control cycle T at a predetermined cycle start time point following the detection time point $t_D$ at which the detection signal $S_D$ was received from the sensor unit 120. At this time, the user inputs a selection from the input interface 150 indicating that the movement speed V of the machining tool 136 is to be corrected over the course of the constant speed movement period $T_C$.

FIG. 6B shows this series of operations in terms of the relationship between the elapsed time and the movement speed of the tool. As shown in FIG. 6B, in the machining control method according to embodiment 3, similarly to the case of embodiment 1, when the sensor unit 120 detects passage of the workpiece W at the detection time point $t_D$, which is delayed from the time point $t_1$ by the detection time $T_D$, for example, the main control unit 142, having received the detection signal $S_D$, outputs the control command signal $S_P$ for starting to drive the machining tool 136 at a predetermined cycle start time point (the time point $t_2$, for example) following the detection timing $t_D$.

Simultaneously, the main control unit 142 calculates the delay equivalent movement amount S by which the machining tool 136 will have moved by the time point $t_2$ assuming driving thereof is started at the detection time point $t_D$ using formula 1 described above. Then, while the machining tool 136 is being driven, the control command signal $S_P$, which is modified by adding (tacking on) a speed corresponding to the calculated delay equivalent movement amount S during the constant speed movement period $T_C$, as selected in advance by the user, is output in each control cycle T. Thus, the movement speed V of the machining tool 136 reaches a speed that is equivalent to the delay equivalent movement amount S taking the response delay time $T-T_D$ corresponding to the detection time $T_D$ into account, and as a result, machining can be executed by the machining tool 136 in the correct machining location of the workpiece W.

Embodiment 4

Figure 7A:
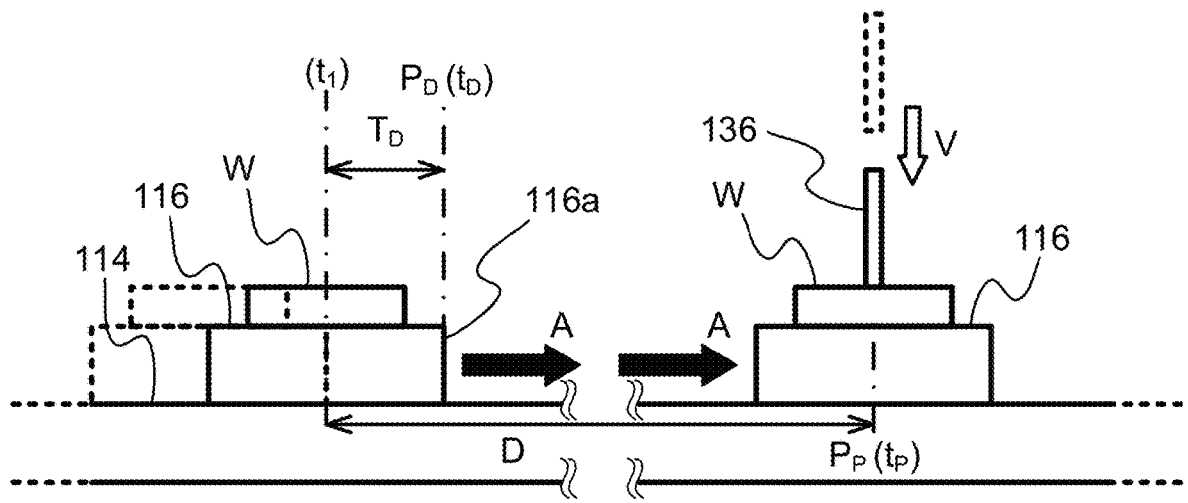
FIG. 7A is a schematic view showing a machining control method according to embodiment 4.
Figure 7B:
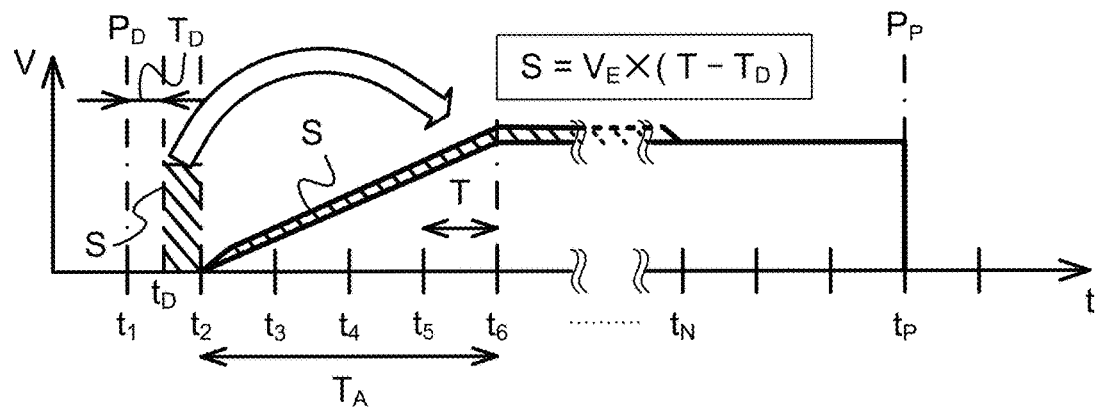
FIG. 7B is a schematic view showing the machining control method according to embodiment 4.

FIGS. 7A and 7B are schematic views showing a machining control method according to embodiment 4. In the machining control method according to embodiment 4, the movement speed V of the machining tool 136 is corrected by adding (tacking on) thereto evenly from the start of movement of the machining tool 136 on the basis of a user selection.

More specifically, as shown in FIG. 7A, when the workpiece W is detected by the sensor unit 120 after being conveyed further by a distance corresponding to the detection time $T_D$, in the machining control unit 140, which receives the detection signal $S_D$ at the detection time point $t_D$, similarly to embodiment 1, the main control unit 142 calculates the delay equivalent movement amount S based on the response delay time $T-T_D$ and outputs the control command signal $S_P$, in which the movement speed V of the machining tool 136 has been modified in accordance with the delay equivalent movement amount S, as a distributed pulse in each control cycle T at a predetermined cycle start time point following the detection time point $t_D$ at which the detection signal $S_D$ was received from the sensor unit 120. At this time, the user inputs a selection from the input interface 150 indicating that the movement speed V of the machining tool 136 is to be corrected by adding thereto evenly (at a constant speed) from the start of movement of the machining tool 136.

FIG. 7B shows this series of operations in terms of the relationship between the elapsed time and the movement speed of the tool. As shown in FIG. 7B, in the machining control method according to embodiment 4, similarly to the case of embodiment 1, when the sensor unit 120 detects passage of the workpiece W at the detection time point $t_D$, which is delayed from the time point $t_1$ by the detection time $T_D$, for example, the main control unit 142, having received the detection signal $S_D$, outputs the control command signal $S_P$ for starting to drive the machining tool 136 at a predetermined cycle start time point (the time point $t_2$, for example) following the detection time point $t_D$.

Simultaneously, the main control unit 142 calculates the delay equivalent movement amount S by which the machining tool 136 will have moved by the time point $t_2$ assuming driving thereof is started at the detection time point $T_D$ using formula 1 described above. Then, while the machining tool 136 is being driven, the control command signal $S_P$, which is modified by adding a speed corresponding to the calculated delay equivalent movement amount S evenly (at a constant speed) from the start of movement of the machining tool 136, as selected in advance by the user, is output in each control cycle T. Thus, the movement speed V of the machining tool 136 reaches a speed that is equivalent to the delay equivalent movement amount S taking the response delay time $T_D$ corresponding to the detection time $T_D$ into account, and as a result, machining can be executed by the machining tool 136 in the correct machining location of the workpiece W.

At this time, the parameters for correcting the movement speed V of the machining tool 136 can also be set as desired on the basis of the delay equivalent movement amount S. For example, a correction completion time may be input in advance and the speed may be added in equal parts within the correction completion time, or a correction completion distance (movement amount) of the machining tool 136 may be input in advance and the speed may be added in equal parts within the correction completion distance.

Embodiment 5

Figure 8A:
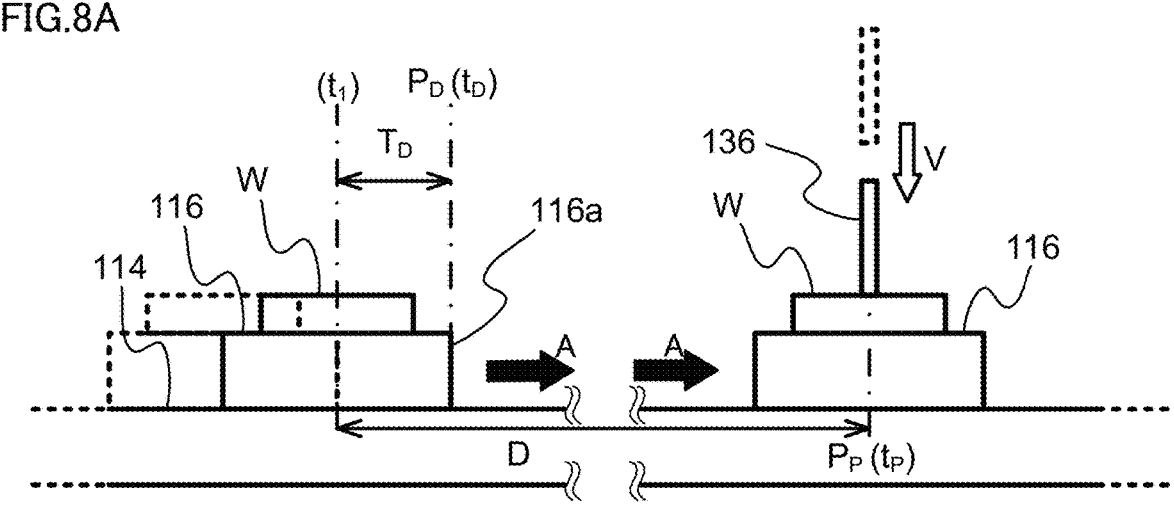
FIG. 8A is a schematic view showing a machining control method according to embodiment 5.
Figure 8B:
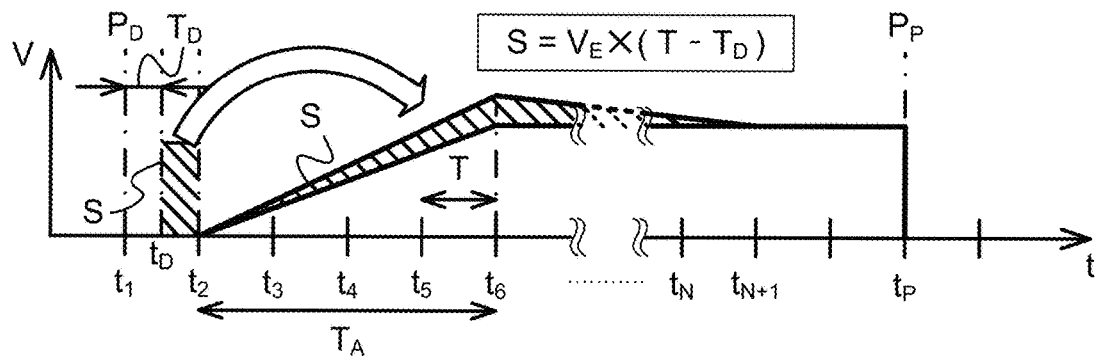
FIG. 8B is a schematic view showing the machining control method according to embodiment 5.

FIGS. 8A and 8B are schematic views showing a machining control method according to embodiment 5. In the machining control method according to embodiment 5, the movement speed V of the machining tool 136 is corrected by gradually increasing the speed add-on amount in the acceleration period $T_A$ and gradually reducing the speed add-on amount in the constant speed movement period $T_C$ on the basis of a user selection.

More specifically, as shown in FIG. 8A, when the workpiece W is detected by the sensor unit 120 after being conveyed further by a distance corresponding to the detection time $T_D$, in the machining control unit 140, which receives the detection signal $S_D$ at the detection time point $t_D$, similarly to embodiment 1, the main control unit 142 calculates the delay equivalent movement amount S based on the response delay time $T-T_D$ and outputs the control command signal $S_P$, in which the movement speed V of the machining tool 136 has been modified in accordance with the delay equivalent movement amount S, as a distributed pulse in each control cycle T at a predetermined cycle start time point following the detection time point tD at which the detection signal $S_D$ was received from the sensor unit 120. At this time, the user inputs a selection from the input interface 150 indicating that the movement speed V of the machining tool 136 is to be corrected by gradually increasing the speed add-on amount in the acceleration period $T_A$ and gradually reducing the speed add-on amount in the constant speed movement period $T_C$.

FIG. 8B shows this series of operations in terms of the relationship between the elapsed time and the movement speed of the tool. As shown in FIG. 8B, in the machining control method according to embodiment 5, similarly to the case of embodiment 1, when the sensor unit 120 detects passage of the workpiece W at the detection time point $t_D$, which is delayed from the time point $t_1$ by the detection time $T_D$, for example, the main control unit 142, having received the detection signal $S_D$, outputs the control command signal $S_P$ for starting to drive the machining tool 136 at a predetermined cycle start time point (the time point $t_2$, for example) following the detection time point $t_D$.

Simultaneously, the main control unit 142 calculates the delay equivalent movement amount S by which the machining tool 136 will have moved by the time point $t_2$ assuming driving thereof is started at the detection time point $t_D$ using formula 1 described above. Then, while the machining tool 136 is being driven, the control command signal $S_P$, which is modified by gradually increasing the speed add-on amount of the speed corresponding to the calculated delay equivalent movement amount S in the acceleration period $T_A$ and gradually reducing the speed add-on amount in the constant speed movement period $T_C$, as selected by the user in advance, is output in each control cycle T. Thus, the movement speed V of the machining tool 136 reaches a speed that is equivalent to the delay equivalent movement amount S taking into account the response delay time $T_D$ corresponding to the detection time $T_D$, and as a result, machining can be executed by the machining tool 136 in the correct machining location of the workpiece W. Furthermore, with the control according to this embodiment, the speed transitions of the machining tool 136 can be made smooth.

Figure 9:
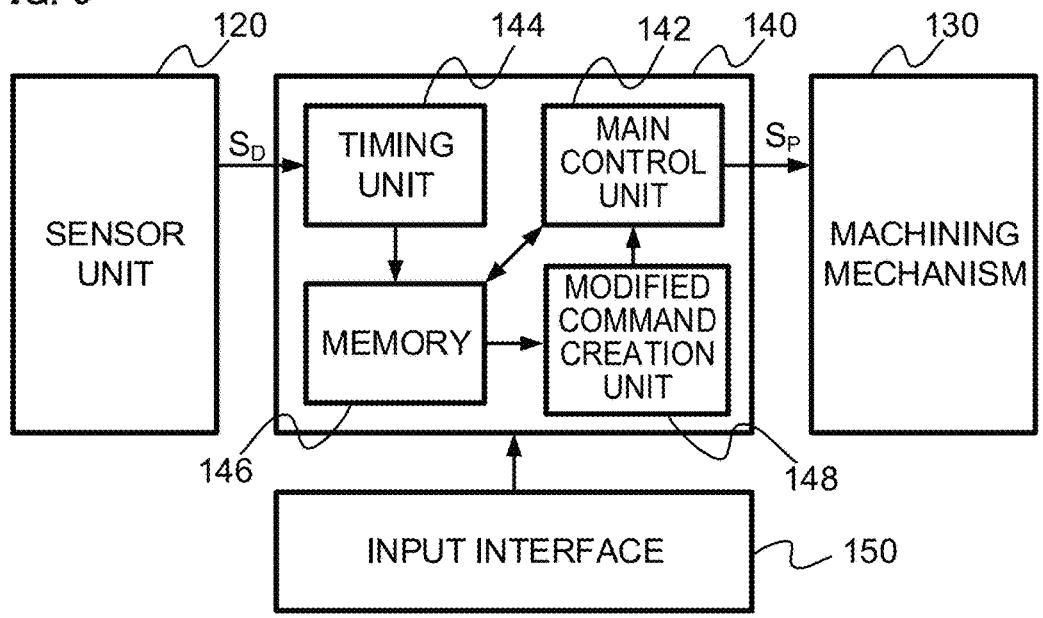
FIG. 9 is a block diagram showing a modified example of the machining control unit shown in FIG. 1.

FIG. 9 is a block diagram showing a modified example of the machining control unit shown in FIG. 1. As shown in FIG. 9, the machining control unit 140 according to the modified example is configured to include, for example, the main control unit 142, the timing unit 144, the memory 146, and a modified command creation unit 148 that creates individual distributed pulse components for modifying the operation command signal $S_P$ output to the machining unit 130 on the basis of the response delay time $T-T_D$ corresponding to the detection time $T_D$. By providing the main control unit 142 with the modified command creation unit 148 as an independent unit, the operation load of the main control unit 142 can be reduced in comparison with a case where the main control unit 142 creates the modified command.

As described above, with the workpiece machining device and the machining control method using the workpiece machining device illustrated in FIGS. 1 to 9, when a workpiece is machined by a predetermined machining tool by activating a machining mechanism of a machining unit on the basis of a detection signal from a sensor unit that detects passage of the moving workpiece, the detection time taken to receive the detection signal relative to a cycle start time point of a predetermined control cycle for controlling the machining mechanism is measured, and the machining tool is controlled by modifying an operation command signal issued to the machining mechanism in each control cycle on the basis of a response delay time corresponding to the detection time. Hence, during control of a machining device for machining a workpiece moving at a predetermined speed, a reduction in the machining precision due to a deviation between the control cycle and the detection timing of the workpiece can be suppressed.

Further, as illustrated in embodiments 1 to 5, when the movement speed of the machining tool is corrected on the basis of a delay equivalent movement amount corresponding to the response delay time, the user can select the speed pattern of the movement speed as desired, and as a result, control can be performed in accordance with the various needs and desired effects of the user.

Furthermore, previously, detection of the workpiece by the sensor unit was dependent on the control cycle of the main control unit of the machining control unit, and therefore the control cycle constituted the precision limit for correcting positional deviation of the workpiece. According to the above embodiments, however, the clock cycle of the counter of the timing unit constitutes the correction precision limit, and therefore a dramatic improvement is achieved in the precision with which positional deviation of the workpiece is corrected. As an example thereof, when, for example, the transportation speed of the workpiece is set at 18 m/min, the control cycle of the main control unit is set at 10 msec, and the clock cycle of the timing unit is set at 1 μsec, the positioning precision using the main control unit alone results in a maximum positional deviation of approximately 3 mm, whereas according to the above embodiments, the positioning precision can be improved to a maximum of approximately 0.3 mm.

Note that the present invention is not limited to the embodiments described above and may be modified as appropriate within a scope that does not depart from the spirit thereof. Any of the constituent elements of the embodiments of the present invention may be either modified or omitted within the scope of the invention.

For example, in the above embodiments, an example in which the timing unit 144 executes an operation to calculate the response delay time $T-T_D$ from the detection time $T_D$ was described, but the operation to calculate the response delay time $T-T_D$ may be executed by the main control unit 142.

The invention claimed is:

1. A workpiece machining device, comprising:
   a sensor unit configured to transmit a detection signal upon detection of passage of a moving workpiece,
   a machining unit arranged after the sensor unit in a moving direction of the workpiece and configured to perform machining on the workpiece using a predetermined machining tool by activating a machining mechanism while the workpiece is moving, and
   a machining control unit configured to control an operation of the machining unit based on the detection signal from the sensor unit, wherein
   the machining control unit includes
      a main control unit configured to transmit an operation command signal to the machining mechanism of the machining unit at intervals of a unique control cycle of the main control unit,
      a timing unit configured to measure a detection time taken to receive the detection signal relative to a cycle start time point of the unique control cycle, and
      a memory that stores various parameters including the detection time,
   a difference between the cycle start time point of the unique control cycle and the detection time is defined as a response delay time, and
   the main control unit is configured to modify a command value of the operation command signal in each unique control cycle based on the response delay time.

2. The workpiece machining device according to claim 1, wherein
   the sensor unit is configured as a non-contact type sensor that does not contact the workpiece.

3. The workpiece machining device according to claim 1, wherein
   the memory is configured to, when a plurality of workpieces is moving simultaneously, store a detection time for each individual workpiece of the plurality of workpieces, and
   the machining control unit is configured to modify the command value of the operation command signal for said each individual workpiece based on the response delay time relating to said each individual workpiece of the plurality of workpieces.

4. The workpiece machining device according to claim 1, wherein
   the main control unit is configured to
      calculate, based on the response delay time, a delay equivalent movement amount by which the predetermined machining tool is assumed to have moved by a next cycle start time point of the unique control cycle,
      modify a movement speed of the predetermined machining tool in accordance with the delay equivalent movement amount, and
      transmit the operation command signal having the modified command value at a predetermined cycle start time point following a detection time point at which the detection signal is received from the sensor unit.

5. The workpiece machining device according to claim 4, further comprising:
   an input interface connected to the machining control unit, wherein
   the main control unit is configured to modify the movement speed in accordance with an arbitrary modification pattern input from the input interface.

6. The workpiece machining device according to claim 5, wherein
   the machining control unit further includes a modified command creation unit configured to calculate the delay equivalent movement amount and modify the movement speed in each unique control cycle.

7. A machining control method for performing machining on a workpiece using a predetermined machining tool by activating a machining mechanism of a machining unit arranged after a sensor unit in a moving direction of the workpiece while moving the workpiece based on a detection signal transmitted from a sensor unit that detects passage of the moving workpiece,
   the machining control method comprising
      controlling the machining by measuring a detection time taken to receive the detection signal relative to a cycle start time point of a unique control cycle for controlling the machining mechanism,
      calculating a response delay time from a difference between the cycle start time point of the unique control cycle and the detection time, and
      modifying a command value of an operation command signal transmitted to the machining mechanism in each unique control cycle based on the response delay time.

8. The machining control method according to claim 7, wherein
   the sensor unit is configured as a non-contact type sensor that does not contact the workpiece.

9. The machining control method according to claim 7, further comprising:

when a plurality of workpieces is moving simultaneously,
storing a detection time for each individual workpiece of the plurality of workpieces, and
modifying the command value of the operation command signal for said each individual workpiece based on the response delay time relating to said each individual workpiece.

10. The machining control method according to claim 7, further comprising:
modifying a movement speed of the predetermined machining tool in accordance with a delay equivalent movement amount by which the predetermined machining tool is assumed to have moved by a next cycle start time point of the unique control cycle from the response delay time, and
transmitting the operation command signal having the modified command value at a predetermined cycle start time point following a detection time point at which the detection signal is received from the sensor unit.

11. The machining control method according to claim 10, wherein
a modification pattern for modifying the operation command signal is selected by a user.

12. The machining control method according to claim 11, wherein
the modification pattern includes a speed pattern of the movement speed selected by the user.

13. The workpiece machining device according to claim 1, wherein
the main control unit is configured to
calculate, based on the response delay time, a delay equivalent movement amount by which the predetermined machining tool is assumed to have moved by a next cycle start time point of the unique control cycle, and
adjust a machining timing of the predetermined machining tool by outputting the operation command signal having the modified command value, as a control command signal, to increase a movement speed of the predetermined machining tool in an acceleration period of the unique control cycle by a speed corresponding to the calculated delay equivalent movement amount, wherein the machining timing is a timing of a contact between the predetermined machining tool and the workpiece.

14. The machining control method according to claim 7, further comprising:
calculating, based on the response delay time, a delay equivalent movement amount by which the predetermined machining tool is assumed to have moved by a next cycle start time point of the unique control cycle, and
adjusting a machining timing of the predetermined machining tool by outputting the operation command signal having the modified command value, as a control command signal, to increase a movement speed of the predetermined machining tool in an acceleration period of the unique control cycle by a speed corresponding to the calculated delay equivalent movement amount, wherein the machining timing is a timing of a contact between the predetermined machining tool and the workpiece.

* * * * *